(12) United States Patent
Tanaka et al.

(10) Patent No.: US 10,580,580 B2
(45) Date of Patent: Mar. 3, 2020

(54) METHOD OF MANUFACTURING CERAMIC ELECTRONIC COMPONENT, AND CERAMIC ELECTRONIC COMPONENT

(71) Applicant: Murata Manufacturing Co., Ltd., Nagaokakyo-shi, Kyoto-fu (JP)

(72) Inventors: Junya Tanaka, Nagaokakyo (JP); Shinsuke Uchida, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 56 days.

(21) Appl. No.: 15/229,282

(22) Filed: Aug. 5, 2016

(65) Prior Publication Data

US 2017/0040112 A1 Feb. 9, 2017

(30) Foreign Application Priority Data

Aug. 7, 2015 (JP) .................................. 2015-157595

(51) Int. Cl.
| | |
|---|---|
| *H01G 4/30* | (2006.01) |
| *H01G 4/232* | (2006.01) |
| *H01G 13/00* | (2013.01) |
| *H01G 4/12* | (2006.01) |
| *H01G 4/248* | (2006.01) |
| *H01G 4/224* | (2006.01) |

(Continued)

(52) U.S. Cl.
CPC .............. *H01G 4/30* (2013.01); *H01G 4/012* (2013.01); *H01G 4/12* (2013.01); *H01G 4/232* (2013.01); *H01G 4/248* (2013.01); *H01G 13/003* (2013.01); *H01G 2/10* (2013.01); *H01G 4/224* (2013.01)

(58) Field of Classification Search
CPC ............ H01G 4/30; H01G 4/012; H01G 4/12; H01G 4/232; H01G 4/248; H01G 13/003; H01G 2/10; H01G 4/224
USPC ....................................................... 361/301.4
See application file for complete search history.

(56) References Cited

U.S. PATENT DOCUMENTS

| 9,779,873 B2* | 10/2017 | Kim ........................ H01G 4/005 |
| 2011/0102971 A1* | 5/2011 | Itamura .................... H01G 4/12 |
| | | 361/321.2 |

(Continued)

FOREIGN PATENT DOCUMENTS

| JP | 2014-239139 A | 12/2014 |
| KR | 10-1422938 B1 | 7/2014 |

(Continued)

*Primary Examiner* — Michael P McFadden
(74) *Attorney, Agent, or Firm* — Keating & Bennett, LLP

(57) ABSTRACT

A method of manufacturing a ceramic electronic component including a main body including a first principal surface and a second principal surface opposite to each other, and a first external electrode and a second external electrode provided on a portion of a surface of the main body, includes providing a plurality of recesses in a first principal surface of a laminated block including a ceramic material and an organic substance by relatively moving the laminated block and a protrusion surface including a protrusion, in a direction along the first principal surface of the laminated block with the protrusion surface being in contact with a first principal surface of the laminated block, obtaining a chip by cutting the laminated block including the recesses, and obtaining the main body by firing the chip.

8 Claims, 7 Drawing Sheets

LT SECTIONAL VIEW

(51) Int. Cl.
*H01G 2/10* (2006.01)
*H01G 4/012* (2006.01)

(56) References Cited

U.S. PATENT DOCUMENTS

| | | | |
|---|---|---|---|
| 2014/0151101 A1* | 6/2014 | Lee | H01G 4/12 |
| | | | 174/260 |
| 2015/0083475 A1 | 3/2015 | Kim et al. | |
| 2015/0137668 A1* | 5/2015 | Hoshino | H01L 41/333 |
| | | | 310/365 |
| 2015/0179341 A1 | 6/2015 | Tsutsumi | |

FOREIGN PATENT DOCUMENTS

| | | |
|---|---|---|
| KR | 10-2015-0050355 A | 5/2015 |
| KR | 10-1525676 B1 | 6/2015 |

\* cited by examiner

LT SECTIONAL VIEW

LT SECTIONAL VIEW

LT SECTIONAL VIEW

METHOD OF MANUFACTURING CERAMIC ELECTRONIC COMPONENT, AND CERAMIC ELECTRONIC COMPONENT

CROSS REFERENCE TO RELATED APPLICATIONS

This application claims the benefit of priority to Japanese Patent Application 2015-157595 filed Aug. 7, 2015, the entire contents of which application are hereby incorporated herein by reference.

BACKGROUND OF THE INVENTION

1. Field of the Invention

The present invention relates to a method of manufacturing a ceramic electronic component, and a ceramic electronic component.

2. Description of the Related Art

A component built-in board, in which a ceramic electronic component is included in a mounting board, is used to achieve downsizing of the mounting board. The component built-in board requires improvement of close contact between an electronic component included in the board, and a sealing resin that seals the electronic component. Japanese Patent Laid-open No. 2014-239139 discloses the technique of roughening the surface of an external electrode of a ceramic electronic component with a roughening liquid to improve close contact between the external electrode and a sealing resin. In addition, improvement of close contact between the main body of the ceramic electronic component and a sealing resin is required. In particular, ion migration is likely to occur when a sealing resin is separated from the surface of a main body positioned between two external electrodes. When the ceramic electronic component is mounted on the surface of a mounting board, roughening the surface of the main body can achieve improved close contact with an external electrode formed by baking a conductive paste and reduced variation in the shape of the external electrode, thus preventing separation of the external electrode and a tombstone phenomenon when the ceramic electronic component is mounted. For these reasons, the main body surface of the ceramic electronic component is required to be roughened.

In a method of roughening the main body of a ceramic electronic component, chemical treatment is performed by using a roughening liquid. With this method, the roughening liquid potentially remains inside the main body, and adversely affects the characteristic of the ceramic electronic component. Another method of roughening the main body of the ceramic electronic component is blast processing of causing particles to collide onto the surface of the ceramic electronic component. In this method, corners and edge lines of the ceramic electronic component are excessively ground to round edges of the ceramic electronic component, which may adversely affect mounting stability of the ceramic electronic component and decrease the area of connection with a through hole. Still another method of roughening the main body of the ceramic electronic component is transfer processing of pressing an uneven surface onto the surface of a component. In this method, in order to obtain sufficient roughness, the uneven surface needs to have a large roughness, or a large pressure is needed. However, a large roughness of the uneven surface or a large pressure potentially causes deformation of an inner conductor layer provided inside the main body due to application of a local pressure thereon. The deformation of the inner conductor layer potentially adversely affects the electric characteristic of the ceramic electronic component.

SUMMARY OF THE INVENTION

Preferred embodiments of the present invention provide a ceramic electronic component roughened without the characteristic thereof being adversely affected, and a method of manufacturing the ceramic electronic component.

A method of manufacturing a ceramic electronic component according to a preferred embodiment of the present invention is a method of manufacturing a ceramic electronic component including a main body having a rectangular or substantially rectangular parallelepiped shape and including a first principal surface and a second principal surface opposite to each other, and a first external electrode and a second external electrode provided on a portion of a surface of the main body. The method includes providing a plurality of recesses in a first principal surface of a laminated block including a ceramic material and an organic substance by relatively moving the laminated block and a protrusion surface including a protrusion, in a direction along the first principal surface of the laminated block with the protrusion surface being in contact with the first principal surface of the laminated block; obtaining a chip by cutting the laminated block having the recesses; and obtaining the main body by firing the chip.

A method of manufacturing a ceramic electronic component according to a preferred embodiment of the present invention may further include obtaining the laminated block by pressing a plurality of laminated ceramic sheets and conductive films. In the obtaining of the laminated block, the pressing is preferably performed with an elastic member being placed on a surface to define and function as the first principal surface of the laminated block. In addition, in the obtaining of the laminated block, the pressing is preferably performed with an elastic member being placed on a surface to define and function as the second principal surface of the laminated block.

A method of manufacturing a ceramic electronic component according to a preferred embodiment the present invention preferably further includes providing a plurality of recesses in the second principal surface of the laminated block by relatively moving the laminated block and the protrusion surface having the protrusion, in a direction along the second principal surface of the laminated block with the protrusion surface being in contact with the second principal surface of the laminated block.

A method of manufacturing a ceramic electronic component according to a preferred embodiment of the present invention preferably further includes forming an external electrode on a surface of the chip, in which a plurality of recesses are provided, before the obtaining of the main body by firing the chip.

In a method of manufacturing a ceramic electronic component according to a preferred embodiment of the present invention, recesses extending in one direction are preferably formed in the step of providing of the plurality of recesses in the first principal surface of the laminated block.

In a method of manufacturing a ceramic electronic component according to a preferred embodiment of the present invention, a plurality of protrusion members each including the protrusion surface are preferably used in the step of providing of the plurality of recesses in the first principal surface of the laminated block.

A method of manufacturing a ceramic electronic component according to another preferred embodiment of the present invention is a method of manufacturing a ceramic electronic component including a main body having a rectangular or substantially rectangular parallelepiped shape and including a first principal surface and a second principal surface opposite to each other, and a first external electrode and a second external electrode provided on a portion of a surface of the main body. The method includes obtaining a plurality of chips by cutting a laminated block including a ceramic material and an organic substance; providing a plurality of recesses in first principal surfaces of the chips by relatively moving the plurality of chips and a protrusion surface including a protrusion, in a direction along the first principal surfaces of the chips with the protrusion surface being in contact with the first principal surfaces of the plurality of chips; and obtaining the main body by firing the chips in which the recesses are provided.

A method of manufacturing a ceramic electronic component according to a preferred embodiment of the present invention further includes obtaining the laminated block by pressing a plurality of laminated ceramic sheets and conductive films. In the obtaining of the laminated block, the pressing is preferably performed with an elastic member being placed on a surface that defines and functions as a first principal surface of the laminated block. In addition, in the obtaining of the laminated block, the pressing is preferably performed with an elastic member being placed on a surface that defines and functions as a second principal surface of the laminated block.

A method of manufacturing a ceramic electronic component according to a preferred embodiment of the present invention may further include providing a plurality of recesses in second principal surfaces of the chips by relatively moving the chips and a protrusion surface including a protrusion, in a direction along the second principal surfaces of the chips with the protrusion surface being in contact with the second principal surfaces of the chips.

A ceramic electronic component according to a preferred embodiment of the present invention includes a main body having a rectangular or substantially rectangular parallelepiped shape and including a first principal surface and a second principal surface opposite to each other, and a first external electrode and a second external electrode provided on a portion of a surface of the main body. A plurality of recesses extending in one direction are provided in the first principal surface.

In a ceramic electronic component according to a preferred embodiment of the present invention, the plurality of recesses are preferably provided at least entirely on an exposed portion of the first principal surface.

In a ceramic electronic component according to a preferred embodiment of the present invention, the plurality of recesses are preferably provided at least entirely in the first principal surface.

In a ceramic electronic component according to a preferred embodiment of the present invention, an extending direction of the plurality of recesses is preferably different from a direction parallel or substantially parallel to a length direction of the rectangular or substantially rectangular parallelepiped and is preferably different from a direction perpendicular or substantially perpendicular to the length direction of the rectangular or substantially rectangular parallelepiped.

In a ceramic electronic component according to a preferred embodiment of the present invention, the first external electrode and the second external electrode respectively provided on the first principal surface and the second principal surface preferably each include conductive thin films directly provided on the first principal surface and the second principal surface, and plated layers directly provided on the conductive thin films, and the plated layer preferably has a maximum thickness larger than a maximum thickness of the conductive thin films.

In a ceramic electronic component according to a preferred embodiment of the present invention, the main body preferably includes a plurality of laminated ceramic layers and inner conductor layers, and the plurality of inner conductor layers preferably include a plurality of first inner conductor layers exposed at least on a first end surface of the main body and connected with the first external electrode provided on the first end surface, and a plurality of second inner conductor layers exposed at least on a second end surface of the main body and connected with the second external electrode provided on the second end surface.

In a ceramic electronic component according to a preferred embodiment of the present invention, a plurality of recesses extending in one direction are preferably further provided in the second principal surface, and an extending direction of the recesses in the second principal surface is preferably different from an extending direction of the recesses in the first principal surface.

Various preferred embodiments of the present invention enables manufacture of a ceramic electronic component having improved close contact with a sealing resin by roughening the surface of a main body of the ceramic electronic component without adversely affecting a characteristic of the ceramic electronic component, and provide ceramic electronic components having improved close contact with a sealing resin.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Methods of manufacturing a ceramic electronic component, and ceramic electronic components according to preferred embodiments of the present invention will be described below with reference to the accompanying drawings. However, the present invention is not limited to the following preferred embodiments, but can be modified and applied as appropriate without changing the gist of the present invention. Preferred embodiments of the present invention include any combination of two or more of individual preferred embodiments of the present invention to be described later.

Examples of a ceramic electronic component that can be manufactured by a method of manufacturing a ceramic electronic component according to a preferred embodiment of the present invention include a capacitor, an inductor, a piezoelectric component, and a thermistor. In the following, a capacitor, in particular, a multilayer ceramic capacitor will be described as an exemplary ceramic electronic component that can be manufactured by a method of manufacturing a ceramic electronic component according to a preferred embodiment of the present invention.

Figure 1:
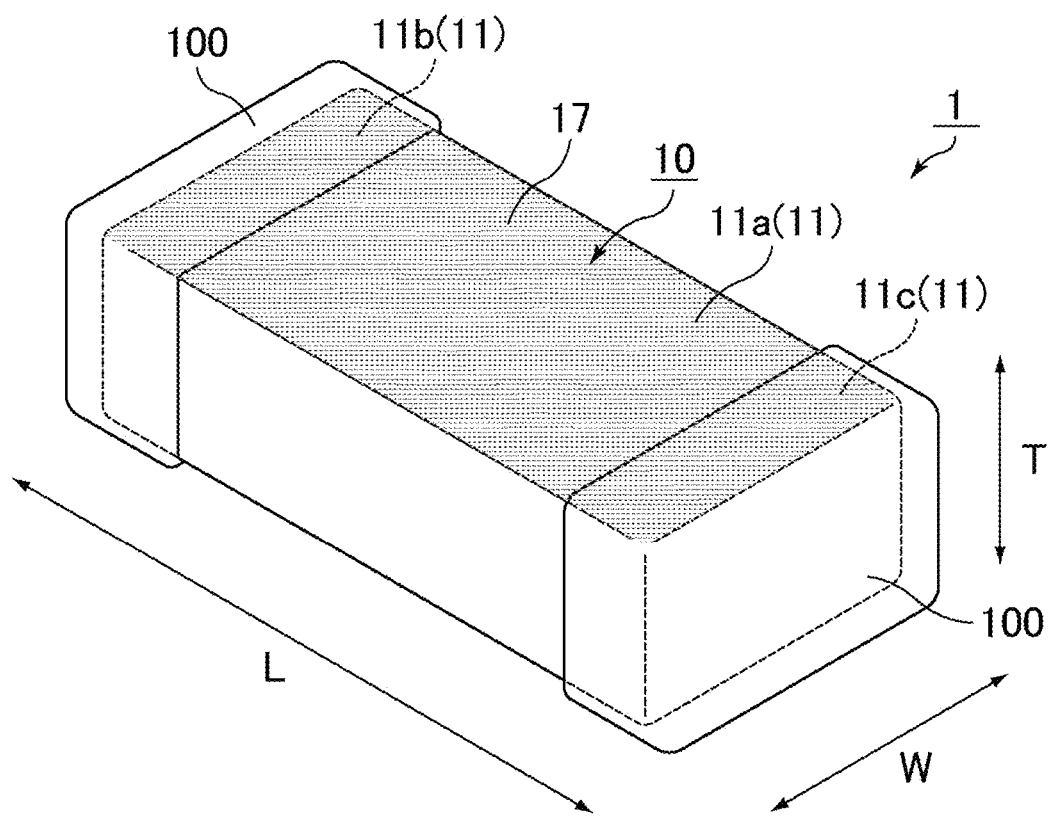
FIG. 1 is a perspective view schematically illustrating an exemplary multilayer ceramic capacitor as a ceramic electronic component according to a preferred embodiment of the present invention.

A multilayer ceramic capacitor includes a main body having a rectangular or substantially rectangular parallelepiped shape, and a plurality of external electrodes provided on a portion of the surface of the main body. FIG. 1 is a perspective view schematically illustrating an exemplary multilayer ceramic capacitor as a ceramic electronic component according to a preferred embodiment of the present invention. A multilayer ceramic capacitor 1 is provided with external electrodes 100 in a portion of the surface of a main body 10.

Figure 2A:
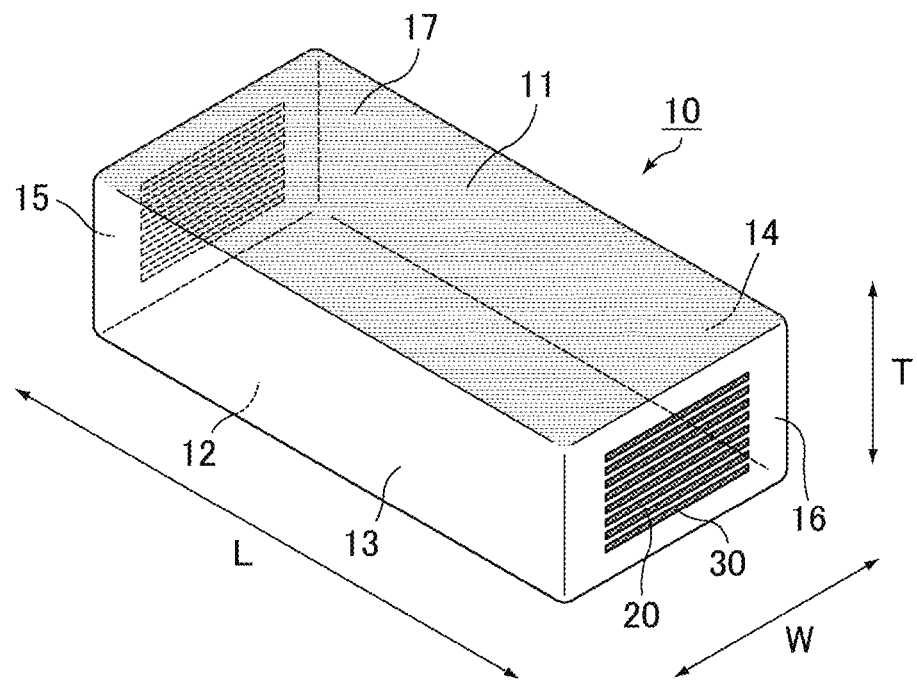
FIG. 2A is a perspective view schematically illustrating an exemplary main body of the multilayer ceramic capacitor illustrated in FIG. 1.
Figure 2B:
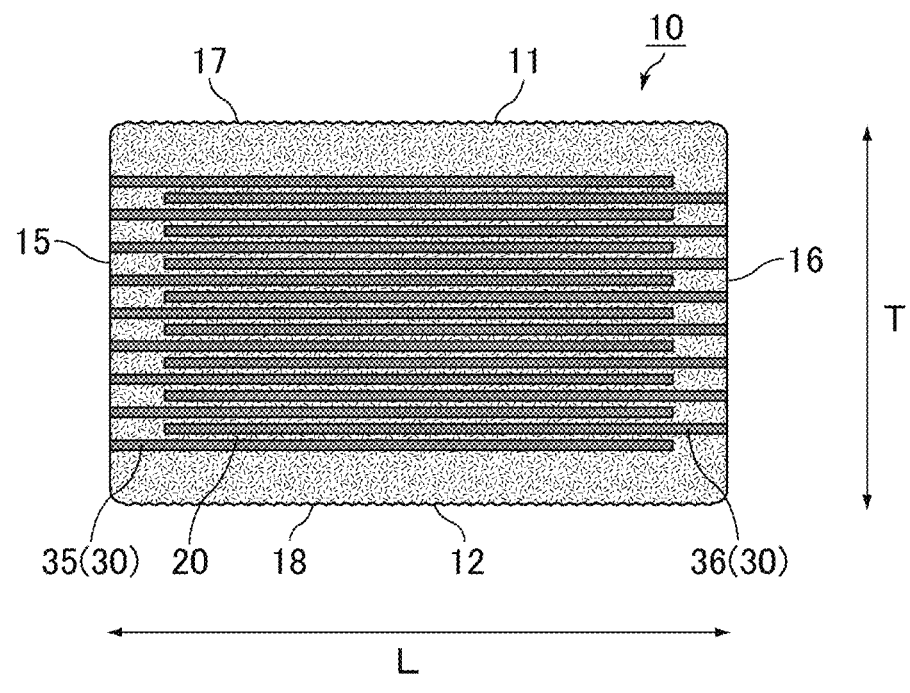
FIG. 2B is an LT sectional view of the main body of the multilayer ceramic capacitor illustrated in FIG. 2A.
Figure 3:
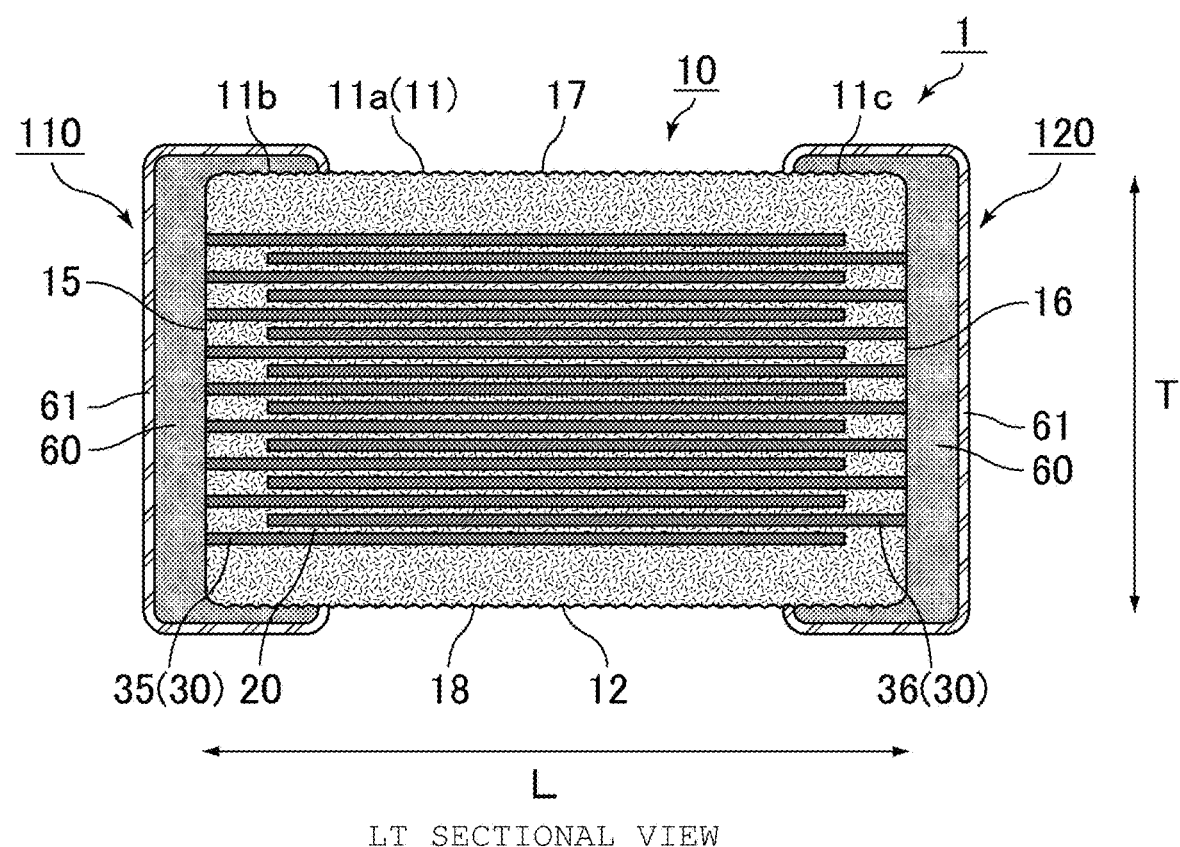
FIG. 3 is an LT sectional view of the multilayer ceramic capacitor illustrated in FIG. 1.

FIG. 2A is a perspective view schematically illustrating an exemplary main body of the multilayer ceramic capacitor illustrated in FIG. 1, and FIG. 2B is an LT sectional view of the main body of the multilayer ceramic capacitor illustrated in FIG. 2A. FIG. 3 is an LT sectional view of the multilayer ceramic capacitor illustrated in FIG. 1.

The main body included in a ceramic electronic component according to a preferred embodiment of the present invention preferably has a rectangular or substantially rectangular parallelepiped shape. The length direction, the width direction, and the height direction of the rectangular or substantially rectangular parallelepiped are respectively defined by the double-headed arrows L, W, and T in the multilayer ceramic capacitor 1 illustrated in FIG. 1 and the main body 10 illustrated in FIG. 2A. The length direction, the width direction, and the height direction are perpendicular or substantially perpendicular to one another. The height direction is a direction in which a plurality of ceramic layers 20 and a plurality of inner conductor layers 30 that are included in the main body 10 are laminated. The length direction is a direction in which external electrodes provided at both ends of the main body face each other (direction in which a plurality of different external electrodes are provided).

The rectangular or substantially rectangular parallelepiped shape of the main body 10 includes six surfaces that are a first principal surface 11 and a second principal surface 12 opposite to each other in the height direction, a first side surface 13 and a second side surface 14 opposite to each other in the width direction, and a first end surface 15 and a second end surface 16 opposite to each other in the length direction. The rectangular or substantially rectangular parallelepiped shape of the main body includes a rectangular or substantially rectangular parallelepiped shape with any of its corners and edge lines being partly rounded to have a curved surface, and a shape including an uneven surface.

An LT section is a section of the ceramic electronic component (multilayer ceramic capacitor) or the main body, which intersects with the first end surface 15 or the second end surface 16 of the multilayer ceramic capacitor 1 or the main body 10 and is aligned with the height direction. FIG. 2B and FIG. 3 are LT sectional views of the main body and the multilayer ceramic capacitor, respectively.

The inner conductor layers 30 may be exposed on any of the first side surface 13, the second side surface 14, the first end surface 15, and the second end surface 16. Any one of these surfaces, on which the inner conductor layers 30 are exposed, may be optionally defined as "the surface of the main body," and a first external electrode 110 and a second external electrode 120 may be provided on a portion of the surface. When the inner conductor layers are exposed on both of the first side surface 13 and the first end surface 15, a "first surface" may be defined as a concept including both of the first side surface 13 and the first end surface 15.

The main body 10 includes the plurality of ceramic layers and the plurality of inner conductor layers 30, which are laminated. The inner conductor layers 30 include a plurality of first inner conductor layers 35 exposed at least on the first end surface 15 of the main body 10 and connected with the first external electrode 110 provided on the first end surface 15, and a plurality of second inner conductor layers 36 exposed at least on the second end surface 16 of the main body 10 and connected with the second external electrode 120 provided on the second end surface 16. With such a configuration, the multilayer ceramic capacitor can achieve favorable performance.

The ceramic layers 20 preferably have an average thickness of, for example, not smaller than about 0.5 μm and not larger than about 4 μm, for example. Each ceramic layer contains a ceramic material containing, as a primary component, for example, barium titanate ($BaTiO_3$), calcium titanate ($CaTiO_3$), strontium titanate ($SrTiO_3$), or calcium zirconate ($CaZrO_3$). The ceramic layer 20 may contain Mn, Mg, Si, Co, Ni, or rare earth elements as an accessory component contained in a smaller amount than that of the primary component.

The inner conductor layers 30 include the first inner conductor layers 35 and the second inner conductor layers 36 alternately arranged in the height direction. The first inner conductor layer 35 includes a facing portion that faces the second inner conductor layer 36 with a ceramic layer 20 interposed therebetween, and an extended portion that is extended from the facing portion to the first end surface 15 and exposed on the first end surface 15. The second inner conductor layer 36 includes a facing portion that faces the facing portion of the first inner conductor layer 35 with a ceramic layer 20 interposed therebetween, and an extended portion that is extended from the facing portion to the second end surface 16 and exposed on the second end surface 16. Each of the inner conductor layers 30 has a rectangular or substantially rectangular shape in a plan view in the height direction. The inner conductor layers 30 preferably have an average thickness of, for example, not smaller than about 0.2 μm and not larger than about 2 μm. The inner conductor layers 30 include, for example, a metal material such as Ni, Cu, Ag, Pd, an Ag—Pd alloy, or Au.

The average thicknesses of the inner conductor layers 30 and the ceramic layers 20 are measured as follows. First, a section of the main body, which is perpendicular or substantially perpendicular to the length direction and exposed by polishing, is observed with a scanning electron microscope. Next, the thicknesses are measured along five lines including a center line passing through the center of the section of the main body and aligned with the height direction, and two lines separated at an equal interval on each side of this center line. Each average thickness is calculated as an average value of these five measured values. To more accurately calculate the average thickness, the five measured values are obtained for each of an upper portion, a central portion, and a lower portion in the height direction, and an average value of these measured values is calculated.

FIGS. 2A, 2B, and 3 illustrate that a plurality of recesses 17 are provided in the first principal surface 11 of the main body 10. The recesses 17 extend in one direction in the first principal surface 11.

The description of "the recesses 17 extend in one direction" indicates a state in which the recesses are aligned not randomly in the first principal surface, and each recess is a continuous groove having a predetermined length instead of being shaped in discrete dimples. The recesses 17 provided in the first principal surface 11 of the main body 10 and extending in one direction in this manner each have a large dimension in the one direction as compared to randomly positioned recesses. Thus, each of the recesses 17 is likely to receive therein a sealing resin and has an increased area of contact with the sealing resin by the capillarity as well. Accordingly, when the multilayer ceramic capacitor 1 is used as a ceramic electronic component for a component built-in board, improved close contact is obtained between the multilayer ceramic capacitor 1 and a sealing resin that seals the multilayer ceramic capacitor 1.

The existence of the recesses 17 provided in the first principal surface 11 and extending in one direction, and the direction of the extension is able to be checked using an optical microscope. The extending direction of the recesses 17 provided in the first principal surface 11 is preferably different from a direction parallel or substantially parallel to the length direction of the rectangular or substantially rectangular parallelepiped of the main body 10 and from a direction perpendicular or substantially perpendicular to the length direction of the rectangular or substantially rectangular parallelepiped. In FIGS. 1 and 2A, the length direction is indicated by the double-headed arrow L, and the direction perpendicular or substantially perpendicular to the length direction is the width direction indicated by the double-headed arrow W. Such an extending direction of the recesses 17 is different from the direction of shortest connection between two external electrodes, and thus reduction in insulation resistance due to ion migration is significantly reduced or prevented. In other words, any ion migration evolves along the extending direction of the recess, which leads to a longer evolution path, and thus reduction in the insulation resistance between the two external electrodes is significantly decreased or prevented.

The recesses 17 preferably extend from one side surface (the first side surface 13) to the other side surface (the second side surface 14). In this case, too, the extending direction of the recesses is different from the direction of shortest connection of the two external electrodes, thus significantly reducing or preventing reduction in the insulation resistance between the two external electrodes due to the ion migration.

The recesses 17 provided in the first principal surface are preferably grooves extending in one direction, and the surface roughness (arithmetic average roughness Ra) of the first principal surface measured by a laser surface roughness meter is preferably not smaller than about 0.01 μm and more preferably not smaller than about 0.04 μm, for example. When the recesses are grooves extending in one direction and the first principal surface has a surface roughness not smaller than about 0.01 μm, the sealing resin penetrates into the recess by the capillarity, so that the area of contact between the sealing resin and the first principal surface increases, and close contact between the sealing resin and the first principal surface is likely to be improved by the anchor effect. In addition, the recesses are preferably grooves extending in one direction, and the surface roughness of the first principal surface is preferably not larger than about 1.5 μm and more preferably not larger than about 0.4 μm, for example. When the first principal surface has a surface roughness not larger than about 1.5 μm, the electric characteristic is unlikely to deteriorate. The reliability of connection with a through-hole electrode is unlikely to deteriorate. A method in accordance with JIS B 0601 (2001) can be used to measure the surface roughness of each portion included in the multilayer ceramic capacitor, including the first principal surface in which the recesses are provided, in the present specification.

As illustrated in FIG. 1, the first principal surface 11 of the main body 10 is partially covered with the external electrode 100, and thus is not entirely exposed but only partially exposed in some cases. In FIG. 1, the first principal surface 11 has an exposed portion 11a of the first principal surface, and the recesses 17 are provided in the entire exposed portion 11a of the first principal surface. Since the exposed portion 11a of the first principal surface is a portion that contacts the sealing resin, the recesses provided in this portion are able to achieve improved close contact between the multilayer ceramic capacitor and the sealing resin. The close contact between the exposed portion of the first principal surface and the sealing resin is preferably larger than the close contact between the exposed portion of the first side surface or the second side surface and the sealing resin. When the recesses are provided in the exposed portion of the first principal surface but not in the exposed portion of the first side surface or the second side surface, the close contact between the exposed portion of the first principal surface and the sealing resin is larger. The close contact between the ceramic electronic component and the sealing resin is able to be evaluated by JIS 6481-1996.

In an entire view of the first principal surface 11 of the main body 10 as illustrated in FIG. 3, the recesses 17 are also provided in covered portions 11b and 11c of the first principal surface 11, which are portions respectively covered with the first external electrode 110 and the second external electrode 120 and not exposed when included in the multilayer ceramic capacitor. In other words, the recesses 17 are provided in the entire first principal surface 11. When the recesses 17 are provided in the entire first principal surface 11, the exposed portion 11a achieves improved close contact with the sealing resin, and in addition, the covered portions 11b and 11c achieve improved close contact with the first external electrode 110 and the second external electrode 120. This is because, when a paste as the external electrodes is applied to the covered portions, the paste penetrates into the recesses by the capillarity, so that the area of contact between the external electrode and the first principal surface increases, and the close contact between the external electrode and the first principal surface improves by the anchor effect. For this reason, the recesses 17 are preferably provided in the entire first principal surface 11.

In addition, a plurality of recesses 18 extending in one direction may be provided in the second principal surface 12 of the main body 10. The recesses 18 provided in the second principal surface 12 in addition to the recesses 17 provided in the first principal surface 11 achieve further improved close contact between the multilayer ceramic capacitor 1 and the sealing resin that seals the multilayer ceramic capacitor 1.

The extending direction of the recesses 18 in the second principal surface 12 is preferably different from the extending direction of the recesses 17 in the first principal surface 11. When the extending direction of the recesses 18 is different from the extending direction of the recesses 17, upon application of force to shift the sealing resin, a high anchor effect is obtained because either one of the extending directions of the recesses 17 and the recesses 18 is different from the direction of the applied force. This more reliably prevents a break of bonding between the sealing resin and the ceramic electronic component.

In a case in which the performance of the electronic component is different depending on a direction in which the ceramic electronic component is mounted, the direction of the ceramic electronic component needs to be identified from its appearance in some cases. The recesses 17 provided in the first principal surface 11 allow the first principal surface 11 and the other surfaces to be distinguished based on a difference in reflection of light between the first principal surface 11 and the other surfaces. In addition, when the extending directions of the recesses 17 and 18 in the first principal surface 11 and the second principal surface 12 are different from each other, the reflection of light differs between the first principal surface 11 and the second principal surface 12, which allows distinction of the first principal surface 11 and the second principal surface 12.

Preferably, no recess extending in one direction is provided in the first side surface 13 and the second side surface 14 of the main body 10. Thus, the surface roughness of the first principal surface 11 in which the recesses extending in one direction are provided is preferably larger than the surface roughnesses of the first side surface 13 and the second side surface 14 of the main body 10.

The main body 10 preferably has a thin dimension such that DT<DW<DL, (1/5)DW≤DT≤(1/3)DW, or DT<0.25 mm is satisfied, where DT represents the dimension of the main body 10 in the height direction, DL represents the dimension of the main body 10 in the length direction, and DW represents the dimension of the main body 10 in the width direction. The ceramic electronic component with the main body having such a dimension further achieves advantageous effects of a preferred embodiment of the present invention. Specifically, the effect of the present invention is further achieved when 0.05 mm≤DT<0.25 mm, 0.4 mm≤DL≤1 mm, and 0.3 mm≤DW≤0.5 mm are satisfied. The relation among DT, DW, and DL is not limited thereto, but may satisfy, for example, DL<DW.

The external electrodes when viewed in the height direction preferably have dimensions in the length direction larger than the dimension DW of the main body in the width direction. This configuration achieves an increased fixing strength with a mounting board even when a thin ceramic electronic component is mounted. Alternatively, the configuration facilitates through-hole connection to the ceramic electronic component embedded in the board.

FIG. 3 also illustrates the first external electrode 110 and the second external electrode 120 provided on the surface of the main body 10. The following describes preferable configurations of these external electrodes. The first external electrode 110 is provided on the first end surface 15 of the main body 10, and extends from the first end surface 15 to a portion of each of the first principal surface 11, the second principal surface 12, the first side surface 13, and the second side surface 14 to cover each surface. The first external electrode 110 is connected with each of the first inner conductor layers 35 at the first end surface 15. The second external electrode 120 is provided on the second end surface 16 of the main body 10, and extends from the second end surface 16 to a portion of each of the first principal surface 11, the second principal surface 12, the first side surface 13 and the second side surface 14 to cover each surface. The second external electrode 120 is connected with each of the second inner conductor layers 36 at the second end surface 16.

The first external electrode 110 and the second external electrode 120 with the configurations illustrated in FIG. 3 each include an underlayer 60 containing glass and Ni, and a Cu plated layer 61 directly covering the underlayer 60. The Cu plated layer 61 is the outermost layer of each of the first external electrode 110 and the second external electrode 120. The glass contained in the underlayer 60 is preferably a BaO—SrO—B$_2$O$_3$—SiO$_2$ glass frit. The Cu plated layer 61 preferably has an average thickness not smaller than about 1 μm and not larger than about 15 μm, for example. The plated layer may contain at least one metal selected from the group of Ni, Sn, Pd, Au, Ag, Pt, Bi and Zn.

A plurality of plated layers may be provided. For example, the plated layers may include a first Cu plated layer and a second Cu plated layer directly covering the first Cu plated layer. In this case, Cu particles in the second Cu plated layer preferably have an average particle size smaller than an average particle size of Cu particles in the first Cu plated layer. Alternatively, the plated layers may be, in place of the first Cu plated layer and the second Cu plated layer, a Cu plated layer, a Ni plated layer, and a Sn plated layer provided in this order from the underlayer toward the outside. In this case, the Sn plated layer is the outermost layer of each external electrode. The external electrodes 100 may include an external electrode different from the first external electrode 110 and the second external electrode 120, between the first external electrode 110 and the second external electrode 120. The underlayer 60 may contain Cu in place of Ni. The external electrode 100 may only include the plated layers without the underlayer 60.

Figure 4:
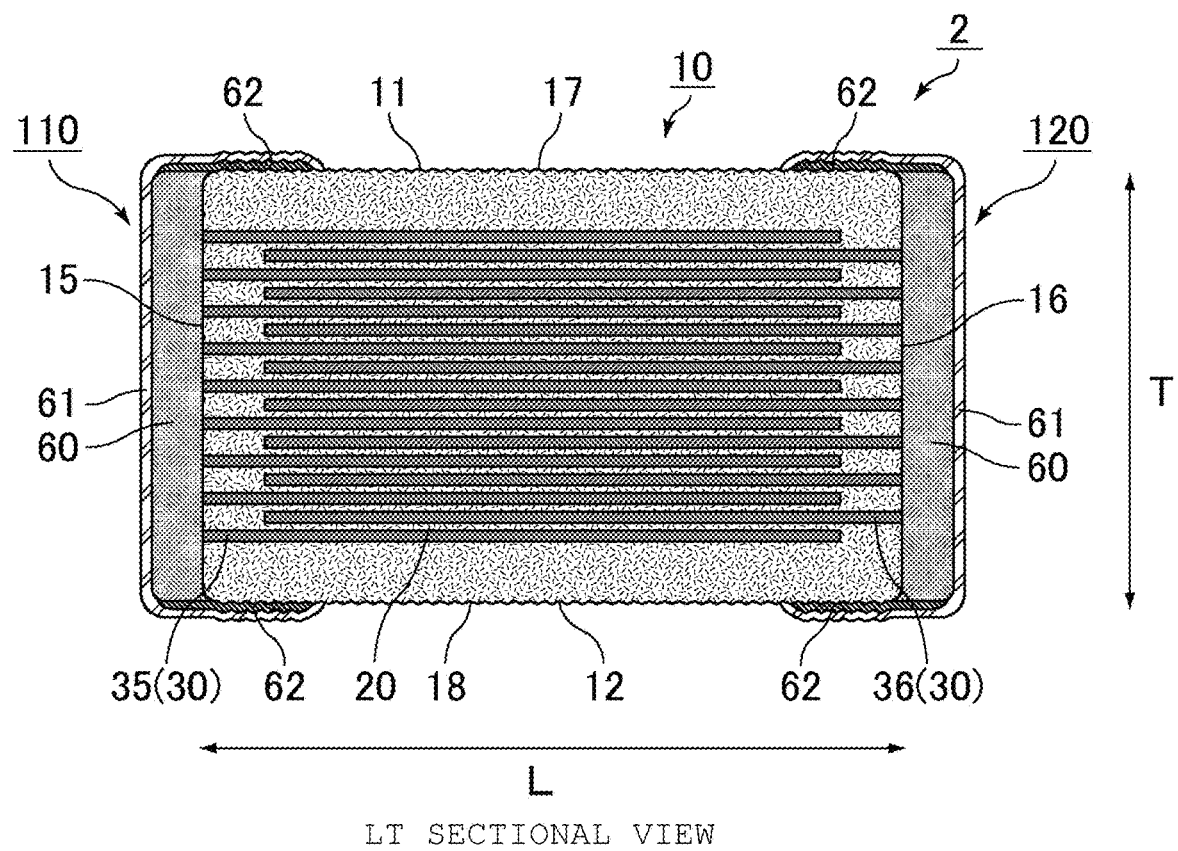
FIG. 4 is an LT sectional view schematically illustrating an exemplary multilayer ceramic capacitor in which external electrodes are configured differently from those of the multilayer ceramic capacitor illustrated in FIG. 3.

FIG. 4 is an LT sectional view schematically illustrating an exemplary multilayer ceramic capacitor in which the configuration of the external electrodes is different from that of the multilayer ceramic capacitor illustrated in FIG. 3. The first external electrode and the second external electrode respectively provided on the first principal surface and the second principal surface. In a ceramic electronic component according to a preferred embodiment of the present invention each include conductive thin films directly provided on the first principal surface and the second principal surface, and plated layers directly provided on the conductive thin films. The plated layer preferably has a maximum thickness larger than the maximum thickness of the conductive thin films.

In a multilayer ceramic capacitor 2 illustrated in FIG. 4, the main body 10 has the same configuration as that of the multilayer ceramic capacitor 1 illustrated in FIG. 3, but the external electrodes have a different configuration. Specifically, a conductive thin film 62 is directly provided on each of the first principal surface 11 and the second principal surface 12, and the Cu plated layer 61 is directly provided on the conductive thin film 62. In other words, no underlayer is included in the first external electrode 110 and the second external electrode 120 on the first principal surface 11 and the second principal surface 12.

The conductive thin film 62 is preferably a sputtered film formed by sputtering or an evaporated film formed by metal deposition, and the conductive thin film 62 preferably has a thickness smaller than about 1 μm, for example. When the conductive thin film 62 is a sputtered film or an evaporated film, the metal contained in the conductive thin film 62 is likely to penetrate into the recesses in the first principal surface 11 and the second principal surface 12. This achieves increased close contact of the conductive thin film 62 with the first principal surface 11 and the second principal surface 12. In addition, on a section on which the external electrodes are provided, the conductive thin film 62 has a maximum thickness smaller than the maximum thickness of the Cu plated film 61. With this configuration, the shapes of the recesses 17 provided in the first principal surface 11 of the main body 10 are reflected on portions of the surfaces of the first external electrode 110 and the second external electrode 120, which are positioned above the first principal surface 11 of the main body 10, so that a plurality of recesses are provided in the portions as well. In other words, a plurality of recesses exist on the surfaces of the first external electrode 110 and the second external electrode 120, thus achieving a ceramic electronic component having improved close contact with the sealing resin on the portions of the first external electrode 110 and the second external electrode 120.

Similarly, when the recesses 18 are provided in the second principal surface 12, the shapes of the recesses 18 provided in the second principal surface 12 are reflected on portions of the surfaces of the first external electrode 110 and the second external electrode 120, which are positioned above the second principal surface 12 of the main body 10, so that a plurality of recesses are provided in the portions as well. In other words, a plurality of recesses exist on the surfaces of the first external electrode 110 and the second external electrode 120 on the second principal surface 12, thus achieving a ceramic electronic component having improved close contact with the sealing resin on the portions of the first external electrode 110 and the second external electrode 120.

A portion of the conductive thin film 62 may be provided on the underlayer 60. In the multilayer ceramic capacitor 2 illustrated in FIG. 4, the conductive thin film 62 is provided on the underlayer 60, and the Cu plated layer 61 is provided on the conductive thin film 62. In other words, the first external electrode 110 and the second external electrode 120 in the multilayer ceramic capacitor 2 illustrated in FIG. 4 are achieved by forming the underlayer 60 first, and then sequentially forming the conductive thin film 62 and the Cu plated layer 61 thereon.

A ceramic electronic component according to a preferred embodiment of the present invention can be used as a built-in electronic component included in a board or as an electronic component mounted on the surface of the board, for example. In the electronic component mounted on the surface of the board, surfaces of external electrodes are, for example, Sn plated layers. The electronic component mounted on the surface of the board has each of the above-described characteristics, and thus achieves effects of the suppression or prevention of variations in the shapes of the external electrodes and the prevention of a tombstone phenomenon.

The following describes a method of manufacturing the multilayer ceramic capacitor as an exemplary method of manufacturing the ceramic electronic component according to a preferred embodiment of the present invention. A ceramic slurry as a mixture of a ceramic material, an organic substance, and a solvent is applied in a sheet shape on a carrier film by printing, spray coating, die coating, or the like so as to obtain a ceramic sheet. The ceramic sheet includes the ceramic material, the organic substance, and the residual solvent. A conductive film, which defines and functions as an inner conductor layer, is formed on the ceramic sheet by screen printing, gravure printing, or the like. A plurality of ceramic sheets on each of which the conductive film is formed are laminated to obtain a laminated sheet. Examples of the organic substance contained in the ceramic sheet include a polyvinyl butyral binder and a phthalate ester binder (for example, dioctyl phthalate).

Figure 5:
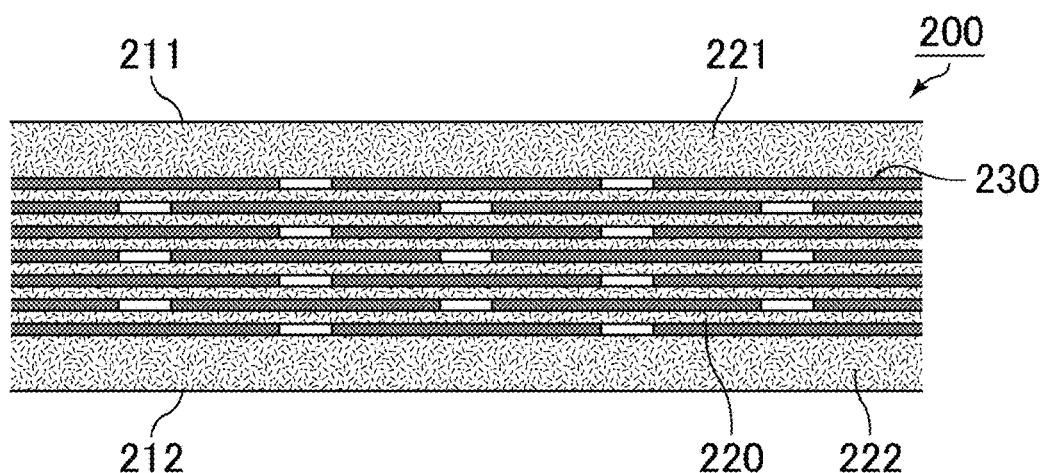
FIG. 5 is a sectional view schematically illustrating an exemplary laminated sheet.

FIG. 5 is a sectional view schematically illustrating an exemplary laminated sheet. A laminated sheet 200 includes a ceramic material and an organic substance, and is provided with a first principal surface 211 and a second principal surface 212. The first principal surface 211 and the second principal surface 212 are respectively an upper surface and a lower surface when pressurized with a press later, and define and function as the first principal surface and the second principal surface in the ceramic electronic component. Ceramic sheets 220 and conductive films 230 are alternately laminated in a central portion of the laminated sheet 200 in a thickness direction thereof. A first protection portion 221 and a second protection portion 222, in which only the ceramic sheets are laminated with no conductive film provided, are provided in an upper portion and a lower portion in the thickness direction. The first protection portion 221 and the second protection portion 222 are provided to protect the laminated structure in the central portion in the thickness direction during a pressing process to be described later. The first protection portion 221 and the second protection portion 222 preferably each have a thickness not smaller than about 5 μm and not larger than about 100 μm, for example. The thicknesses of the protection portions are preferably set to be not smaller than about 5 μm, for example, so as to obtain a sealing characteristic of a chip, and are preferably set to be not larger than 100 μm, for example, so as to obtain a pressure applied to the laminated sheet at the pressing.

The conductive film 230 is not entirely provided. A position at which each conductive film is formed and a position at which each ceramic sheet is laminated are determined so that portions in which no conductive films are provided alternately exist in the thickness direction. In some portions, conductive films are provided in all layers in the thickness direction, and thus the number of laminated conductive films differs among positions.

Figure 6:
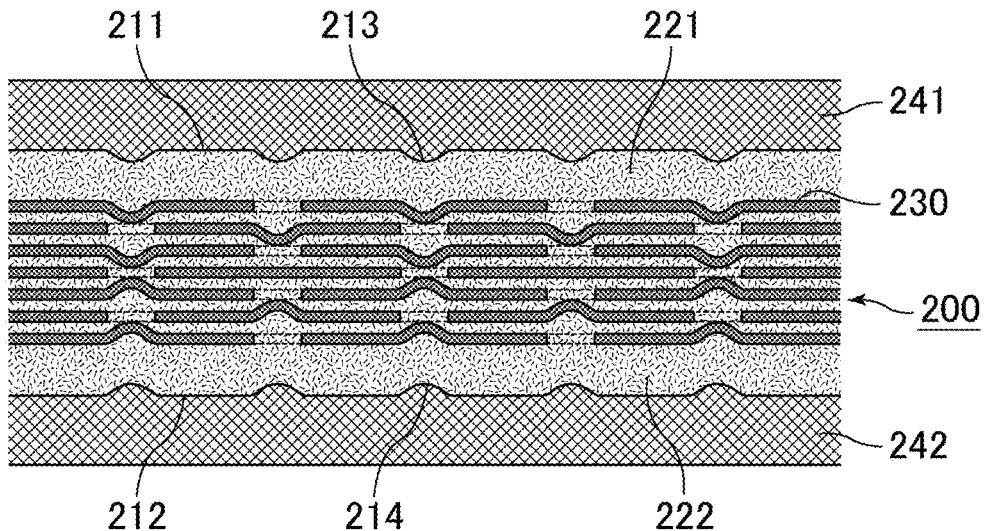
FIG. 6 is a sectional view schematically illustrating an exemplary pressing process of obtaining a laminated block.

The laminated sheet is pressurized by, for example, rigid body pressing or isostatic pressing to be shaped into a laminated block. FIG. 6 is a sectional view schematically illustrating an exemplary pressing process of obtaining the laminated block. In the process of obtaining the laminated block, a plurality of laminated ceramic sheets and conductive films are pressed to obtain the laminated block. FIG. 6 illustrates that the laminated sheet 200 illustrated in FIG. 5 is pressed to obtain a laminated block.

The pressing is preferably performed with an elastic member 241 and an elastic member 242 placed on the first principal surface 211 and the second principal surface 212 of the laminated sheet 200, respectively. As illustrated in FIG. 5, a space exists at a position where fewer conductive films 230 are laminated. As illustrated in FIG. 6, however, this space is filled through the pressing process, and dimples 213 and 214 are generated at this position in the first principal surface 211 and the second principal surface 212 of the laminated sheet 200. The elastic members 241 and 242 are elastic members, the thicknesses of which are able to be changed by the press, and thus are able to fill the dimples 213 and 214 to transfer pressure applied by the press, along the thickness direction at the position. In other words, the use of the elastic members provides improved close contact between sheets at a position where fewer conductive films are laminated. Materials of the elastic members are, for example, rubbers such as silicon rubber.

Figure 7:
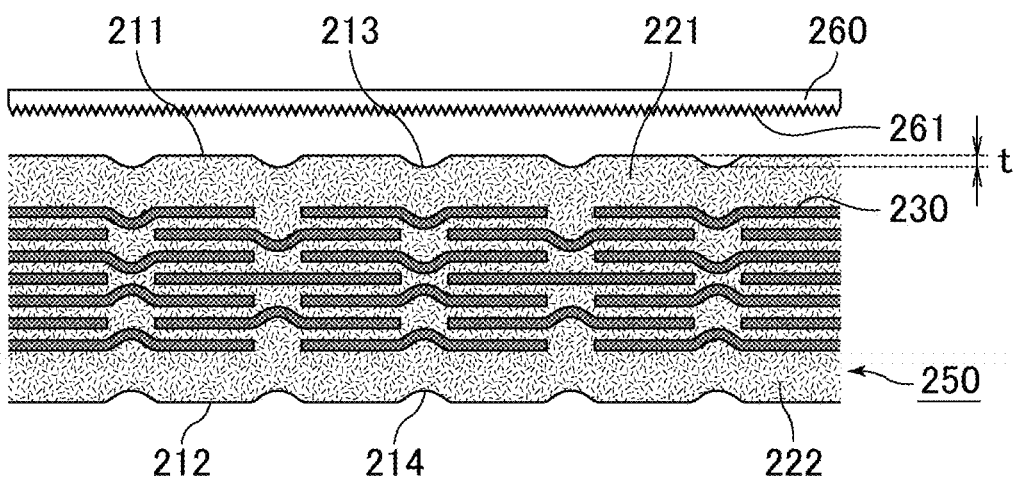
FIG. 7 is a sectional view schematically illustrating an exemplary process of providing a plurality of recesses in a first principal surface of the laminated block.
Figure 8:
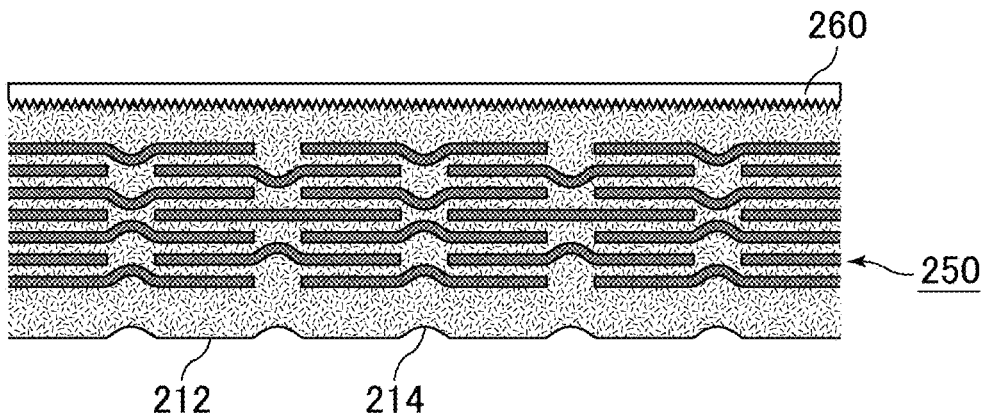
FIG. 8 is a sectional view schematically illustrating an exemplary process of providing a plurality of recesses in the first principal surface of the laminated block.
Figure 9:
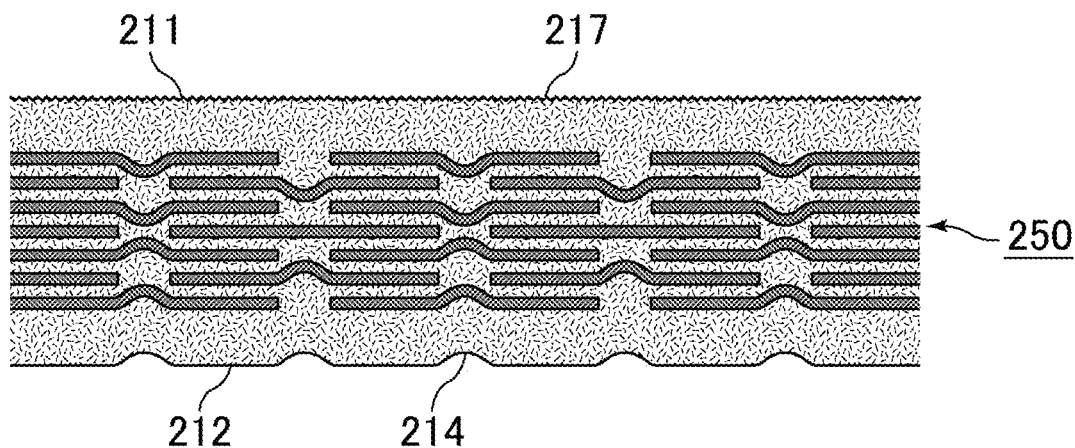
FIG. 9 is a sectional view schematically illustrating an exemplary process of providing a plurality of recesses in the first principal surface of the laminated block.

Subsequently, a plurality of recesses are provided in the first principal surface of the laminated block by relatively moving the laminated block and a protrusion surface of a protrusion member, to which a protrusion is provided, in a direction along the first principal surface of the laminated block with the protrusion surface being in contact with the first principal surface of the laminated block. FIGS. 7, 8, and 9 are each a sectional view schematically illustrating an exemplary process of providing a plurality of recesses in the first principal surface of the laminated block.

A protrusion member 260 including a protrusion surface 261 including a plurality of protrusions is prepared (refer to FIG. 7), and a laminated block 250 and the protrusion surface 261 are relatively moved in a direction along the first principal surface 211 of the laminated block 250 with the protrusion surface 261 being in contact with the first principal surface 211 (refer to FIG. 8). In this process, the protrusion surface 261 scratches the first principal surface 211 of the laminated block 250 to scrape off a portion of the first protection portion 221 of the laminated block 250 in the height direction, thus forming a plurality of recesses 217 in the first principal surface 211 of the laminated block 250 (refer to FIG. 9). It is preferable that the entire first principal surface 211 is scratched to entirely scrape off a portion of the first principal surface 211 of the first protection portion 221 in the height direction, thus forming a plurality of recesses 217 on the entire first principal surface 211 of the laminated block 250. The protrusion surface 261 is preferably moved so that the recesses 217 extend in one direction.

The extending direction of the recesses 217 does not necessarily need to be constant across the entire first principal surface 211 of the laminated block 250, but may differ among chips when the laminated block 250 is cut into the chips later. For example, the protrusion surface 261 may be rotated while being in contact with the first principal surface 211 so as to form recesses. Since the chips are extremely small, the recesses appear to extend in one direction on each chip, but the extending direction of the recesses is different among the chips.

The protrusion surface is preferably in contact with a principal surface on which an elastic member is placed in the pressing process. The principal surface on which an elastic member is placed is provided with a dimple formed in accordance with a difference in the number of laminated conductive films, and has a low flatness. The protrusion surface is scratched while being in contact with the principal surface having a low flatness, thus achieving an improved flatness as well as forming a plurality of recesses extending in one direction. The principal surface having a low flatness leads to a reduced reliability of connection of a through-hole conductor with a built-in ceramic electronic component. In a case of a surface-mounted ceramic electronic component, the ceramic electronic component is potentially mounted in an unstable posture, and erroneous image recognition is potentially caused. Thus, the principal surface of the ceramic electronic component preferably has an improved flatness. According to a ceramic electronic component and a method of manufacturing the ceramic electronic component according to a preferred embodiment of the present invention, the first principal surface preferably has a flatness not larger than about 20 μm, for example. The flatness may be calculated as a difference between a highest point and a lowest point (length indicated by double-headed arrow t in FIG. 7) on the first principal surface, which is measured through observation of the LT section of the main body through an optical microscope.

A ceramic material as a protection a portion of a principal surface on which an elastic member is placed and a dimple is located may be ground and flattened by the protrusion surface until the dimple on the principal surface disappears.

When the dimple is deep, a fabrication time is able to be shortened by performing the fabrication to eliminate the dimple with another protrusion surface having a higher surface roughness before the formation of recesses as compared to the fabrication only with the protrusion surface.

The protrusion surface preferably has a surface roughness not smaller than about 0.01 μm and not larger than about 1.5 μm, for example. The surface roughness is set to be not smaller than about 0.01 μm, for example, so as to obtain recesses having a roughness enough to improve the close contact with the sealing resin. The surface roughness is set to be not larger than about 1.5 μm, for example, so as to reduce a possibility of degrading the electric characteristic by too deep recesses. The material of the protrusion provided on the protrusion surface is preferably, for example, diamond or silica.

Similarly to the first principal surface 211 of the laminated block 250, a plurality of recesses may also be provided in the second principal surface 212 of the laminated block 250 by relatively moving the laminated block 250 and the protrusion surface 261 of the protrusion member 260 in a direction along the second principal surface 212 of the laminated block 250 with the protrusion surface 261 being in contact with the second principal surface 212. A preferable condition of this process may be the same as that for the process of providing the recesses 217 in the first principal surface 211 of the laminated block 250.

Figure 10:
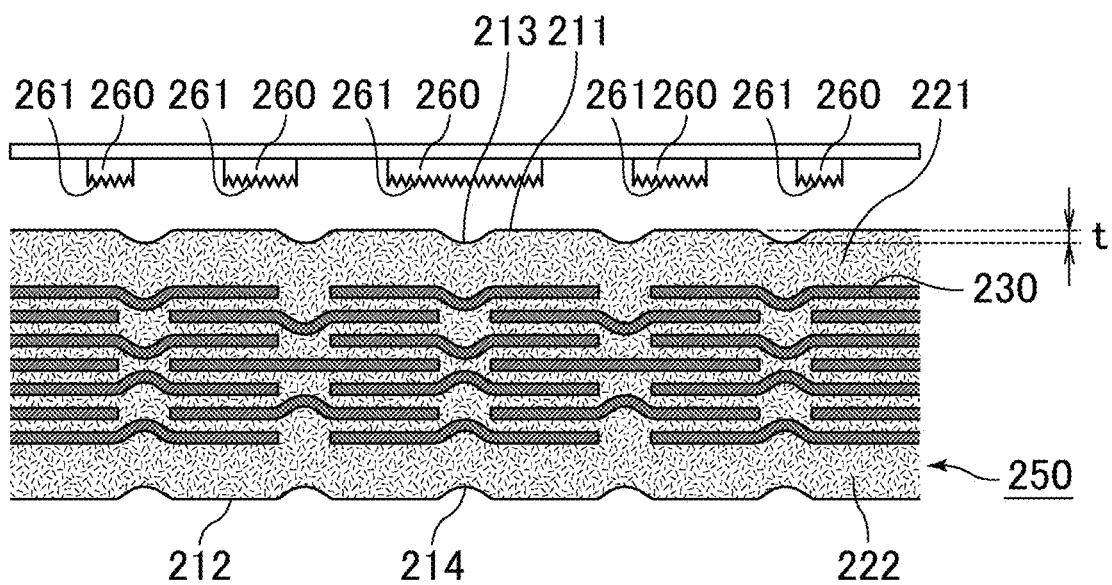
FIG. 10 is a sectional view schematically illustrating an exemplary process of providing a plurality of recesses in the first principal surface of the laminated block using a plurality of protrusion members each including a protrusion surface.

FIG. 10 is a sectional view schematically illustrating an exemplary process of providing a plurality of recesses in the first principal surface of the laminated block using a plurality of protrusion members each having the protrusion surface.

As illustrated in FIG. 10, a plurality of protrusion members 260 may be used. The protrusion members 260 each have the protrusion surface 261. Arrangement of the protrusion members 260 is not particularly limited, but the protrusion members 260 are arranged in, for example, a line, a matrix, or a circumference of a circle on a support stage. The shape of the protrusion surface 261 of each protrusion member 260 is not particularly limited, but is, for example, a rectangular shape, a circle, or a circle with a hole at its central portion (ring). The protrusion members 260 and the laminated block 250 may be relatively moved by, for example, rotating the support stage and the laminated block 250, so as to provide a plurality of recesses in the first principal surface 211 or the second principal surface 212 of the laminated block 250. When the protrusion members 260 and the laminated block 250 are relatively moved through the rotation, too, recesses extending in one direction are formed in the first principal surface 211 or the second principal surface 212 of an individual chip.

Subsequently, the laminated block is cut by pressing or with, for example, a dicing machine to obtain a plurality of chips.

Then, a conductive paste to define a portion of an external electrode is applied to a portion of a surface of each chip by, for example, an immersion method. The chip on which the conductive paste is applied is fired to produce a main body included in a ceramic electronic component, and the conductive paste defines and functions as an underlayer as a portion of the external electrode. The conductive paste may be a paste of Ni powder and glass added to an organic solvent. Through the firing, a conductive film and a ceramic sheet included in the chip define and function as an inner conductor layer and a ceramic layer, respectively.

Then, the external electrode is formed by forming a plated layer on the underlayer through plating. Through these processes, a multilayer ceramic capacitor defining a ceramic electronic component according to a preferred embodiment of the present invention is able to be manufactured.

As illustrated in FIG. 4, when the first external electrode and the second external electrode respectively include the conductive thin films directly provided on the first principal surface and the second principal surface, and the plated layers directly provided on the conductive thin films, the external electrodes are preferably formed as described below.

First, a conductive paste as a portion of the external electrodes is applied only to end surfaces of a chip by, for example, an immersion method. The application of the conductive paste needs to be avoided on the first principal surface and the second principal surface. Next, the chip on which the conductive paste is applied is fired to provide a main body included in a ceramic electronic component, and the conductive paste defines and functions as underlayers as a portion of the external electrodes. Subsequently, conductive thin films are formed on the first principal surface and the second principal surface of the main body. The conductive thin films may be formed by sputtering or metal deposition, for example. Sputtering or metal deposition is preferably performed after positions at which the conductive thin films are to be formed are defined by masking portions of the first principal surface and the second principal surface other than portions on which the conductive thin films are to be formed. The conductive thin films may be formed on the underlayers or on the masked underlayers. Then, the plated layers are formed on the conductive thin films and the underlayers by plating, thus forming the external electrodes.

The following describes another aspect of a method of manufacturing a ceramic electronic component according to a preferred embodiment of the present invention. In this aspect of a method of manufacturing a ceramic electronic component according to a preferred embodiment of the present invention, after a laminated block is acquired by the above-described method, a plurality of chips are obtained by cutting the laminated block, and a plurality of recesses are provided in first principal surfaces of the chips by relatively moving the chips and a protrusion surface including a protrusion, in a direction along the first principal surfaces of the chips with the protrusion surface being in contact with the first principal surfaces of the chips. In other words, the recesses are provided in the chips, not in the laminated block, by the protrusion surface being in contact with the chips. When the laminated block is obtained, the pressing is preferably performed with an elastic member being placed on a surface that defines and functions as the first principal surface of the laminated block, and the pressing is more preferably performed with an elastic member being placed also on a surface that defines and functions as the second principal surface of the laminated block.

In the above aspect, after the chips are acquired, one principal surface of each chip is arranged as an upper surface, and then the chips and the protrusion surface in a direction along the principal surfaces of the chips are relatively moved with the protrusion surface being in contact with the principal surface so as to provide recesses in the principal surfaces of the chips. Through this process, the principal surfaces in which the recesses are provided define and function as the first principal surfaces of the chips. Alternatively, recesses may be provided in the principal surfaces of the chips by relatively moving the chips and the protrusion surface in a direction along the principal surfaces of the chips, with the chips being arranged on the protrusion surface placed facing upward so that one principal surface of each chip is in contact with the protrusion surface. The chips are preferably held by a holding member such as an adhesive sheet.

The method preferably further provides, after providing recesses in the first principal surfaces of the chips, a plurality of recesses in the second principal surfaces of the chips by relatively moving the chips and the protrusion surface including a protrusion, in a direction along the second principal surfaces of the chips with the protrusion surface being in contact with the second principal surface of the chips.

The formation of external electrodes and the firing of the chips can be performed by the method described above on the chips including recesses in the first principal surfaces obtained in this manner, and thus a detailed description thereof is omitted.

EXAMPLES

The following describes examples that more specifically disclose the multilayer ceramic capacitor as an exemplary ceramic electronic component according to a preferred embodiment of the present invention. The present invention is not limited to these examples.

Example 1

1) Manufacturing of Laminated Block

A ceramic slurry was manufactured by adding a polyvinyl butyral binder, a plasticizer, and ethanol as an organic solvent to $BaTiO_3$ as a ceramic material, and wet mixing the components with a ball mill. Then, this ceramic slurry was shaped into a sheet by lip coating to acquire a rectangular ceramic sheet. Next, a conductive paste containing Ni was screen printed on the ceramic sheet to form a conductive film serving as an inner conductor layer containing Ni as a primary component. Subsequently, a plurality of ceramic sheets on each of which the conductive film is formed were laminated, so that the conductive films are extended alternately on both sides, to acquire an unprocessed laminated sheet serving as a capacitor main body as illustrated in FIG. 5. Ceramic sheets defining and functioning as the first protection portion and the second protection portion were laminated above and below this unprocessed laminated sheet in an excess amount of about 50 μm. Elastic members (material: silicon, thickness: about 300 μm) were placed on the first principal surface and the second principal surface of this laminated sheet, and the laminated sheet was shaped under pressure to acquire a laminated block. Dimples due to fewer laminated conductive films were observed on the first principal surface and the second principal surface of the laminated block.

2) Formation of Recesses

The protrusion surface (material: silica, surface roughness Ra in protrusion portion: about 0.5 μm) was moved in a direction along the first principal surface of the laminated block with the protrusion surface being in contact with the first principal surface so as to scratch the laminated block by about 50 μm, thus forming a plurality of recesses in the first principal surface. Through this process, any dimples in the first principal surface and the second principal surface of the laminated block were eliminated.

3) Cutting of Laminated Block and Firing of Chips

Figure 11:
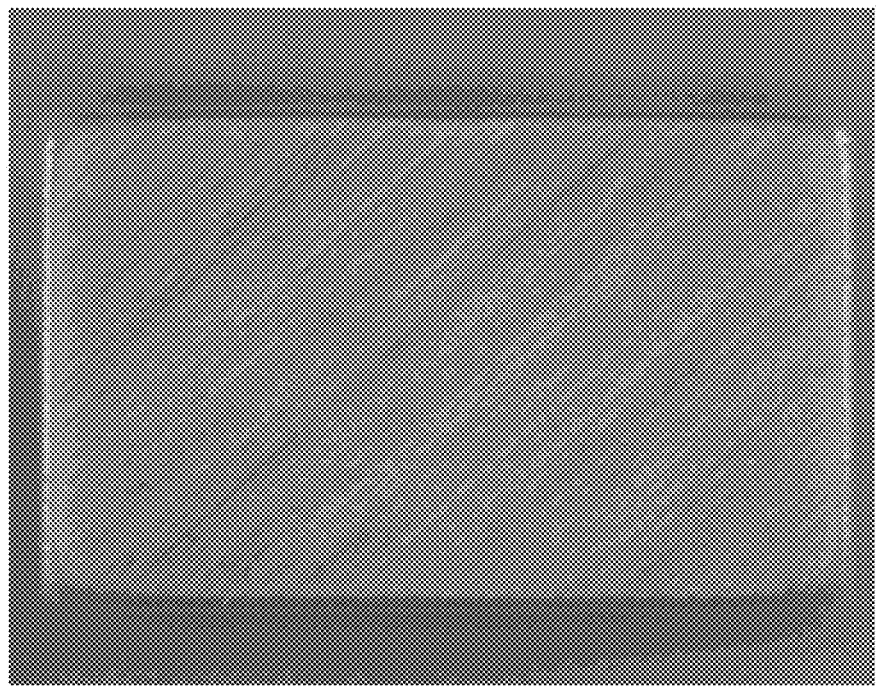
FIG. 11 is a top view of a first principal surface of a main body including a recess formed in Example 1.

The laminated block in which recesses are formed was cut with a dicing machine to acquire chips. The obtained chips were heated in a $N_2$ atmosphere to combust the binder, and then fired in a reducing atmosphere including $H_2$, $N_2$, and $H_2O$ gases to acquire a sintered main body. The obtained main body has dimensions of about 1.0 mm in the length direction (DL), about 0.5 mm in the width direction (DW), and about 0.22 mm in the height direction (DT). FIG. 11 is a top view of the first principal surface of the main body including recesses formed in Example 1. As illustrated in FIG. 11, recesses extending in one direction were formed in the first principal surface of the main body.

Comparative Example 1

After a laminated block was acquired similarly to Example 1, the cutting of the laminated block and the firing of chips were performed, without forming recesses, to acquire a main body. No recesses extending in one direction were formed in the first principal surface of the obtained main body.

Measurement of Surface Roughness and Flatness

The surface roughness and the flatness were measured for the first principal surfaces of the main bodies acquired in Example and Comparative Example 1. The surface roughness was the arithmetic average roughness Ra measured by using a laser surface roughness meter (model number: VK-X210 manufactured by Keyence Corporation). The flatness was calculated as a difference between a highest point and a lowest point on the first principal surface (length indicated by double-headed arrow t in FIG. 7), which were measured in observation of the LT section of the main body through an optical microscope. The results are shown in Table 1.

Measurement of Close Contact with Resin

A prepreg material as a sealing resin was applied to the first principal surfaces of the main bodies acquired in Example 1 and Comparative Example 1 and cured, and then the close contact of the resin was measured by a method in accordance with JIS C6481-1996. As a result, the close contact (not smaller than about 1.2 kN/m) of the main body acquired in Example 1 with the resin was higher than the close contact (approximately 0.6 kN/m) of the main body acquired in Comparative Example 1 with the resin.

TABLE 1

| | Recess Formation | Surface Roughness of First Principal Surface (Ra: μm) | Flatness of First Principal Surface (μm) | Resin Close Contact |
|---|---|---|---|---|
| Example 1 | Yes | 0.5 μm | 2 μm or smaller | Strong |
| Comparative Example 1 | No | 0.6 μm | 30 μm | Weak |

The surface roughness of the first principal surface was larger in Comparative Example 1 than in Example 1, but no recesses extending in one direction were formed in the first principal surface of the main body manufactured in Comparative Example 1, and dimples formed by a press remained. With such dimples, the surface roughness has a high measured value, but these dimples are thought not to contribute to improvement of the close contact with the resin by the capillarity. In contrast, recesses extending in one direction were provided in the first principal surface of the main body manufactured in Example 1, and thus the resin is thought to penetrate into the recesses by the capillarity. As a result, the main body manufactured in Example 1 is thought to have a stronger close contact with the resin than that of the main body manufactured in Comparative Example 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a main body including a first principal surface and a second principal surface opposite to each other;
   a first external electrode and a second external electrode provided on a portion of a surface of the main body; and
   a plurality of recesses extending in one direction along the first principal surface; wherein
   all of the plurality of recesses extend in the one direction along the first principal surface; and
   the first principal surface includes a covered portion that is covered by one of the first and second external electrodes and includes the plurality of recesses.

2. The ceramic electronic component according to claim 1, wherein the plurality of recesses are provided at least entirely on an exposed portion of the first principal surface.

3. The ceramic electronic component according to claim 1, wherein the plurality of recesses are provided at least entirely in the first principal surface.

4. The ceramic electronic component according to claim 1, wherein an extending direction of the plurality of recesses is different from a direction parallel or substantially parallel to a length direction of the main body and is different from a direction perpendicular or substantially perpendicular to the length direction of the main body.

5. The ceramic electronic component according to claim 1, wherein:
   the first external electrode and the second external electrode respectively provided on the first principal surface and the second principal surface each include conductive thin films directly provided on the first principal surface and the second principal surface, and plated layers directly provided on the conductive thin films; and the plated layer has a maximum thickness larger than a maximum thickness of the conductive thin films.

6. The ceramic electronic component according to claim 1, wherein:

the main body includes a plurality of laminated ceramic layers and inner conductor layers; and the plurality of inner conductor layers include a plurality of first inner conductor layers exposed at least on a first end surface of the main body and connected with the first external electrode provided on the first end surface, and a plurality of second inner conductor layers exposed at least on a second end surface of the main body and connected with the second external electrode provided on the second end surface.

7. The ceramic electronic component according to claim 1, wherein:

a plurality of recesses extending in one direction are further provided in the second principal surface; and an extending direction of the recesses in the second principal surface is different from an extending direction of the recesses in the first principal surface.

8. The ceramic electronic component according to claim 1, wherein the main body has a rectangular or substantially rectangular parallelepiped shape.

* * * * *